Patented Feb. 12, 1952

2,584,969

UNITED STATES PATENT OFFICE 2,584,969

PREPARATION OF A DERIVATIVE OF CYCLOHEXENE

John Harold Chapman, Ruislip, England, assignor to Glaxo Laboratories Limited, Greenford, England, a British company No Drawing. Application February 9, 1950, Serial No. 143,342. In Great Britain February 25, 1949

15 Claims. (Cl. 260—666)

1

This invention is concerned with improvements in or relating to the preparation of a derivative of cyclohexene namely 2:6:6-trimethyl-1-ethynylcyclohexene which may be represented by the following structural formula

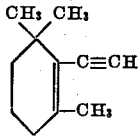

This compound is believed to be of use in the synthesis of vitamin A.

British Specification No. 627,453 describes a process for the preparation of derivatives of 1-ethynylcyclohexene as there defined, including 2:6:6-trimethyl-1-ethynylcyclohexene, in which the corresponding ethynylcyclohexanol is passed in the vapour phase over a heated metal phosphate catalyst.

I have now found that the thermal decomposition of esters of the general formula

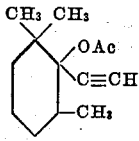

(where Ac is an acyl group derived from an acid AcOH which is a saturated aliphatic carboxylic acid having from 2 to 6 carbon atoms and which contains a normal or branched chain, excluding trialkylacetic acids that is, having at least one hydrogen atom attached to the α carbon atom) leads to the formation of 2:6:6-trimethyl-1-ethynylcyclohexene; this process has been found to be more convenient than that described in British Specification No. 627,453 in so far as this particular derivative is concerned.

The preparation of the esters of 2:6:6-trimethyl-1-ethynylcyclohexan-1-ol of the above stated general formula is described in my copending application Serial No. 143,341 of even date herewith.

According to the present invention therefore I provide a process for the preparation of 2:6:6-trimethyl-1-ethynylcyclohexene in which a compound of the general formula

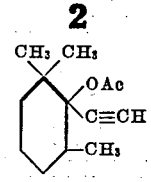

is subjected to the action of heat under such conditions that the elements of the acid AcOH (where Ac has the above stated meaning) are split off and 2:6:6-trimethyl-1-ethynylcyclohexene is formed.

According to a further feature of the invention the heat treatment is carried out in the presence of a catalyst.

The temperature at which the heat treatment may take place has been found to vary according to the particular ester being treated, whether a catalyst is used or not, and to the nature of the catalyst (if used). It will be necessary in each particular case to carry out a few preliminary tests to determine the optimum conditions of reaction for any given materials. It may here be mentioned that if too high a temperature is used there is a risk that the 2:6:6-trimethyl-1-ethynylcyclohexene will undergo further change, for example, decomposition or polymerisation with corresponding drop in yield. Thus in a series of experiments on any particular ester it will in general be noted that the yield increases as the temperature of reaction is raised until a point of maximum yield is obtained, further increases in reaction temperature beyond this point result in a decrease in the yield of the desired substance. I have found, for example, that where the group Ac is the acetyl group the ester may be successfully decomposed at a temperature of about 320–330° C. without the use of a catalyst.

I have found that various substances may be used as catalysts in the process according to the invention and that it is impossible to define generally what substances are suitable and what are not; it is accordingly necessary to determine by experiment what materials are suitable for this purpose. Furthermore, as stated above, the optimum conditions of decomposition vary according to the catalyst used and must also be determined by experiment in any given case.

In my investigations to determine what substances may be used as catalysts I found that some substances were good catalysts, some poor catalysts while some materials behaved as inhibitors and apparently prevented the desired reaction taking place at all. The following is a table of results of experiments I have carried out to determine the catalytic effect of various substances, in the process according to the invention applied to the thermal decomposition of the acetate of the carbinol:

TABLE

| Catalyst | Yield |
| --- | --- |
| No catalyst........................ per cent.. | 5. |
| Zinc..................................do.... | 30. |
| Iron..................................do.... | 6. |
| Barium Oxide.........................do.... | 9. |
| Zinc Oxide...........................do.... | 40. |
| Aluminum Oxide.......................do.... | 9.5. |
| Lead Oxide...........................do.... | 30. |
| Lead Dioxide.........................do.... | 22. |
| Ferric Oxide.........................do.... | 30. |
| Sodium acetate.......................do.... | 12.5. |
| Lead acetate.........................do.... | 12.5. |
| Magnesium Oxide......................do.... | 3. |
| Magnesium | negligible. |
| Tin | Do. |
| Aluminum | Do. |
| Silver | Do. |
| Manganese | Do. |
| Cobalt | Do. |
| Nickel | Do. |
| Molybdenum | Do. |
| Tungsten | Do. |
| Copper Oxide bismuth oxide | Do. |
| Bismuth Oxide | Do. |
| Manganese dioxide | Do. |
| Calcium hydroxide | Do. |
| Di-ethylaniline | Do. |
| Copper | product destroyed. |
| Copper oxide | Do. |
| Mercuric oxide | Do. |

Certain catalysts, such for example as ferric oxide have been found to produce other substances in addition to the desired 2:6:6-trimethyl-1-ethynylcyclohexene but in general the yield of such other substance is low in comparison with that of the desired substance.

I prefer to use zinc, zinc oxide, lead oxide, lead dioxide or ferric oxide as catalyst.

It will be understood that the use of mixed catalysts, whilst not recommended would not fall outside the scope of the present invention.

Where a catalyst is used it has been found that the temperature at which the desired reaction takes place is considerably lower, thus for example we have found that with certain combinations of ester and catalyst, the optimum reaction temperature is within the range of 150–200° C.

The reaction may for example be carried out by continuous distillation of the desired product from the heated ester either alone or admixed with the catalyst or alternatively by passing the starting material in the liquid or vapour state through a pyrolysis tube of suitable dimensions which tube may if desired be packed with a substance such as glass wool to increase the hot surface area of the reaction zone.

Alternatively the reaction may be carried out in an inert solvent of high boiling point, such for example as tetralin or the material known as "Dow Corning Silicone 550" if desired, in the presence of a catalyst, the reaction being effected, for example by heating the mixture at its boiling point under reflux.

Whichever method of effecting the process according to the invention is chosen, it is preferable that the reaction be carried out in an inert atmosphere, for example in an atmosphere of nitrogen.

I prefer to use the acetate of 2:6:6-trimethyl-cyclohexan-1-ol as starting material in the process according to the invention.

The 2:6:6-trimethyl-1-ethynylcyclohexene may for example be isolated either by fractional distillation or by the formation of a suitable derivative, for example, the silver salt. The 2:6:6-trimethyl-1-ethynylcyclohexene has been found to be a rather unstable compound when exposed to air and light; it has however been found to be stable if kept, for example, at 0° C. in the presence of a small quantity of an anti-oxidant such as hydroquinone.

The esters used as starting materials in the process according to the invention may be prepared in any convenient manner but at present I prefer to prepare them by the method described in my said copending application Serial No. 143,341.

In order that the invention may be well understood the following examples are given only as illustrations:

EXAMPLE 1

2:6:6-trimethyl-1-ethynylcyclohexyl acetate (25 g.) and zinc dust (4 g.) were placed in a distillation apparatus and, in nitrogen at 160 mm. heated in an oil-bath. At 180° C. (bath) a vigorous reaction occurred and liquid commenced to distil. The bath temperature was then gradually raised to 200° C. When no further liquid distilled the pressure was rapidly reduced to 21 mm. leaving a dry residue in the flask. The distillate contained some acetic acid and on working up in the usual way and fractionating almost pure 2:6:6-trimethyl-1-ethynylcyclohexene (7 g.) was obtained. Purification by formation of the silver salt and regeneration with ammonium thiocyanate gave 2:6:6-trimethyl-1-ethynylcyclohexene (5.5 g.; 31%) as a colourless liquid B.P. 67° C./14 mm.; $n_D^{14°}$ 1,4942; it showed an absorption maximum at 228 m$\mu$ having $\epsilon$ 13,200. (Found: C, 89.6; H, 11.1. $C_{11}H_{16}$ requires C, 89.1; H, 10.9%) Active hydrogen (Zerewitinoff), 1.03. Hydrogenation with Adams catalyst in acetic acid showed 2.7 F.

The liquid became purple on standing in air but was stable at 0° C. after the addition of a small quantity of hydroquinone.

EXAMPLE 2

2:6:6-trimethyl-1-ethynylcyclohexyl acetate (25 g.) and zinc oxide (9.75 g.) were reacted exactly as described in the Example 1. The distillate contained water. On working up and purifying through the silver salt, 2:6:6-trimethyl-1-ethynylcyclohexene (5 g.; 28%) was obtained.

EXAMPLE 3

*Pyrolysis of 2:6:6-trimethyl-1-ethylcyclohexyl propionate*

2:6:6-trimethyl-1-ethynylcyclohexyl propionate (27 g.) and zinc oxide (5 g.) were heated in silicone oil (20 ml.) to 180–200° C. at 160 mm. pressure with stirring. After working up in the same way crude 2:6:6-trimethyl-1-ethynylcyclohexene (7.1 g.; $E_{1cm}^{1\%}$ 703, 30%)

was obtained. Purification via the silver salt, as previously described, gave a purer product (4.3 g; $E_{1cm}^{1\%}$ 812, 22%) $\epsilon$ 12,000

EXAMPLE 4

*Pyrolysis of 2:6:6-trimethyl-1-ethynylcyclohexyl acetate*

2:6:6-trimethyl-1-ethynylcyclohexyl acetate (25 g.) zinc oxide (5 g.) and tetralin (100 ml.) were stirred in a 500 ml. flask fitted with a short fractionating column, in nitrogen. The mixture was heated until slow distillation commenced; the head temperature rose immediately to 198° C. and remained at this point for 2 hours, during which time 50 mls. of distillate had been collected. The distillate was added to the filtered residue and treated with a mixture of 100% aqueous silver nitrate solution (50 ml.) and ethanol (250 ml.) and further ethanol added until a clear solution was obtained. After standing for 6 hours the precipitate (6.2 g.) was reacted with aqueous ammonium thiocyanate solution in the usual way and gave 2:6:6-trimethyl-1-ethynylcyclohexene (0.6 g.; $E_{1cm.}^{1\%}$ 807, 3%)

EXAMPLE 5

Decomposition of the acetate (a) In the presence of zinc oxide and silicone oil:

2:6:6-trimethyl-1-ethynylcyclohexyl acetate (25 g.) zinc oxide (5 g.; 1 equivalent) and silicone oil (D. C. 550:20 ml.) were stirred vigorously at 160 mm. and gradually heated. The distillate (17 g.) contained some acetic acid and was worked up as in Example 1 giving a fraction boiling up to 90°/12 mm. (7.5 g.) $n_D^{14}$ 1.4950 λ max. 228

$E_{1cm.}^{1\%}$ 815

(38% based on $E_{1cm.}^{1\%}$ 900 for pure product), and a fraction B. P. 120°C/12 mm. (8.5 g.). The low-boiling fraction was treated with 10% alcoholic silver nitrate and gave a silver salt (20 g.). Regenerated as in Example 1 2:6:6-trimethyl-1-ethynylcyclohexene (6.5 g.: 36%).

(b) Using a similar technique but different catalysts the following results were obtained.

| No. | Catalyst | Yield |
|---|---|---|
| | | Per cent |
| 1 | Barium oxide | 9 |
| 2 | Zinc oxide | 42 |
| 3 | Alumina | 9.5 |
| 4 | Lead oxide (PbO) | 30.0 |
| 5 | Lead dioxide | 22.7 |
| 6 | Ferric oxide | 30 |
| 7 | Sodium acetate | 12.5 |
| 8 | Lead acetate | 12.5 |
| 9 | Iron | 6.0 |

(c) Over zinc oxide-pumice:

The catalyst consisted of zinc oxide deposited on 4–8 mesh pumice and occupied 45 cm. of a 2.5 cm. (internal) Pyrex tube. It was heated to 350° C. and 2:6:6-trimethyl-1-ethynylcyclohexyl acetate (50 g.) at 100° C. (from a steam-heated dropping funnel) was dropped onto the catalyst, the tube being vertical. The whole apparatus was evacuated to 14 mm. The addition took one hour and gave a condensate (38 g.) of $E_{1cm.}^{1\%}$ 372

(44.7% yield). The fraction boiling up to 90°/14 mm. (14.2 g.) gave the silver salt (27.5 g.) on treatment with alcoholic silver nitrate. Based on average figures this gave on regeneration 2:6:6-trimethyl-1-ethynylcyclohexene (9.2 g.; 26%) which had $E_{1cm.}^{1\%}$ 760 (22%)

EXAMPLE 6

Decomposition of caproate

2:6:6-trimethyl-1-ethynylcyclohexyl caproate treated with zinc dust as in Example 1 gave 2:6:6-trimethyl-1-ethynylcyclohexene in 25% yield.

EXAMPLE 7

Uncatalysed pyrolysis of 2:6:6-trimethyl-1-ethynylcyclohexyl acetate

2:6:6-trimethyl-1-ethynylcyclohexyl acetate (7 g.) was distilled slowly at 14 mm. (N₂) through 1" x 24" glass tube packed with glass-wool and heated to 320–330°. The distillate (6.2 g.) was worked up in the usual way and gave a low-boiling fraction B. P. 58–100°/13 mm. (0.4 g.) having λ max. 228

$E_{1cm.}^{1\%}$ 630

After purification via the silver salt 2:6:6-trimethyl-1-ethynylcyclohexene (0.25 g. 5%) was obtained, having λ max. 229

$E_{1cm.}^{1\%}$ 840

I claim:

1. A process for the preparation of 2:6:6-trimethyl-1-ethynylcyclohexene which comprises, subjecting a compound of the general formula

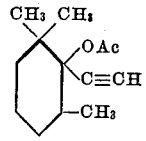

where Ac is an acyl group derived from an acid AcOH which is a saturated aliphatic carboxylic acid having from 2 to 6 carbon atoms and at least one hydrogen atom on the α carbon atom, to the action of heat to split off the elements of the acid AcOH and form 2:6:6-trimethyl-1-ethynylcyclohexene.

2. A process as claimed in claim 1 in which the reaction is carried out in the presence of a catalyst.

3. A process as claimed in claim 1 in which the reaction is carried out in the presence of a catalyst selected from the group consisting of zinc, zinc oxide, lead mono-oxide, lead dioxide and ferric oxide.

4. A process as claimed in claim 2 in which the temperature of the reaction is within the range of from 150°–200° C.

5. A process as claimed in claim 1 in which the reaction is carried out without a catalyst at a temperature of approximately 320–330°.

6. A process as claimed in claim 1 in which the reaction is carried out by distilling the starting material under reduced pressure through a pyrolysis tube.

7. A process as claimed in claim 1 in which the reaction is conducted in an inert solvent of high boiling point.

8. A process as claimed in claim 1 in which 2:6:6-trimethyl-1-ethynylcyclohexene is purified by conversion to its silver salt.

9. A process for the preparation of 2:6:6-trimethyl-1-ethynylcyclohexene which comprises, subjecting 2:6:6-trimethyl-1-ethynylcyclohexan-1-ol acetate to the action of heat to split off acetic acid and form 2:6:6-trimethyl-1-ethynylcyclohexene.

10. The process defined in claim 9 in which the reaction is carried out in the presence of a catalyst.

11. A process for the preparation of 2:6:6-trimethyl-1-ethynylcyclohexene which comprises, heating 2:6:6-trimethyl-1-ethynylcyclohexan-1-ol acetate to a temperature within the range of 150° C.–200° C. in the presence of a catalyst selected from the group consisting of zinc, zinc oxide, lead mono-oxide, lead dioxide and ferric oxide.

12. The process defined in claim 11 in which the reaction is carried out by distilling said acetate under subatmospheric pressure through a pyrolysis tube maintained at a temperature within said range, said tube being packed with said catalyst.

13. The process defined in claim 11 in which the reaction is carried out in an inert solvent of high boiling point.

14. The process defined in claim 11 in which the reaction is carried out in a silicone oil as an inert solvent.

15. The process defined in claim 11, in which the reaction is carried out in tetralin as an inert solvent.

JOHN HAROLD CHAPMAN.

REFERENCES CITED

The following references are of record in the file of this patent:

Studies in Pyrolysis, by Burns et al., Chemical Society Journal, Part I, 1935, pages 400–406.

Synthesis Products Related to Vitamin A, by Milas et al., J. A. C. S., vol. 70, pages 1829–1834.